United States Patent
Pinckney et al.

[11] Patent Number: 5,425,628
[45] Date of Patent: Jun. 20, 1995

[54] PRESSURE BAG FOR TOOL CORE

[75] Inventors: Robert L. Pinckney, Glen Mills; Lee Kitson, North Hills; Edward J. Schickling, Jr., Conshohocken, all of Pa.

[73] Assignee: The Boeing Company, Seattle, Wash.

[21] Appl. No.: 122,958

[22] Filed: Sep. 20, 1993

[51] Int. Cl.⁶ .............................................. B29C 33/00
[52] U.S. Cl. ....................... 425/389; 425/405.1; 425/405.2
[58] Field of Search .................. 156/224, 245, 285; 425/389, 405.1, 405.2; 264/314, 315

[56] References Cited

U.S. PATENT DOCUMENTS

| | | | |
|---|---|---|---|
| 3,184,528 | 5/1965 | Norwalk | 425/405.2 |
| 4,370,120 | 1/1983 | Foster et al. | 425/405.2 |
| 4,702,870 | 10/1987 | Setterholm et al. | 264/87 |
| 4,732,415 | 3/1988 | Matia et al. | 285/169 |
| 4,876,049 | 10/1989 | Aoyma et al. | 264/49 |
| 5,087,193 | 2/1992 | Herbert | 425/523 |
| 5,127,813 | 7/1992 | Omata et al. | 425/125 |
| 5,131,834 | 7/1992 | Potter | 425/405.2 |

Primary Examiner—Michael W. Ball
Assistant Examiner—Richard Crispino
Attorney, Agent, or Firm—Jones, Tullar & Cooper

[57] ABSTRACT

A tool core is disclosed for forming an opening in a composite structure. The composite structure comprises a structural core with inner and outer skins formed on a mandrel, sealed in an impervious fabric bag and cured at elevated temperature and pressure in an enclosed chamber. The tool core is formed by a tool core inner member of simi-rigid material enclosed in an inflatable elastic bag. The interior of the tool core bag is exposed to the elevated pressure of the closed chamber and therefor inflates during the curing process to conform the tool core precisely to the opening in the structural core.

4 Claims, 2 Drawing Sheets

PRESSURE BAG FOR TOOL CORE

BACKGROUND OF THE INVENTION

Advanced composite structures are generally composed of multiple layers of high strength materials in fabric or tape form, impregnated with polymer resins. Presently, most such structures are formed or "laid up" on female molds which are formed in the desired shape of the finished product. Many of these structures, in order to provide additional strength or to provide additional thickness to the part are made with a semi-rigid core material sandwiched between layers of composite material. Where it is required to attach fittings to a composite part or openings are required in the surface of the part, the structural core material is removed in a certain area and the edges of the opening are chamfered before the core is laid in the mold. Typically, the outer skin of the structure is laid into the tool and a layer of adhesive is added to the inside of this skin. Next, the core, with its cut-out opening is placed on top of the outer skin. After adding another layer of adhesive, the fabric or tape which will be the inner skin of the finished structure is placed on top of the structural core.

The assembly is next placed in a pliable vacuum bag, typically Nylon, and the bag is sealed to the mold around the part. A slight vacuum is drawn on the inside of the bag in order to compress the structure and hold it in place. The mold with the sealed structure is then placed in a pressure chamber such as an autoclave, where the pressure is increased to further compress the part to form the shape of the mold and heat is applied according to a predetermined schedule to cure the part. The pressure of the autoclave causes the inner skin to conform to the chamfered opening in the core and the desired opening shape results.

Today, instead of laying sheets of tapes or fabric in female molds as described above, new methods and automated machinery have been developed which allow the material, in the form of thin strips or "tows", to be applied directly to a male mold or to a tool. This modern method allows large parts to be fabricated with considerably less labor required to fabricate the part. However, when this fiber placement method is used, the creation of openings in the structural core becomes more difficult. When using a male mold or tool the chamfered core openings are inverted and a tool core must be placed on the tool surface to form an opening in the finished product. Typically, the tool cores are fastened to the tool surface and the structural core is cut out in the same shape and is intended to be located directly above the tool core such that when the structure is cured, the desired opening will result.

The problem arises because the structural core openings are cut by a technician using a template. First, it is difficult to carve the openings to exact dimensions and, in addition, the structural core is not rigid and tends to deform when it is handled. Thus it is desirable to find a means of installing tool cores on a male tool such that the desired openings are formed in the correct place and are of the proper size when the part is formed by an automated fiber placement method.

SUMMARY OF THE INVENTION

The invention discloses a tool core and a method of using it that provides a solid surface to form the inner skin during lay-up, but has the ability to conform to irregularities in the core during cure. The invention discloses a tool core comprised of a rigid inner member formed in the general shape of the desired opening in the finished part, which has an opening through its thickness to its lower inside surface and is enclosed in an elastomeric, inflatable bag. The tool core contains means for releasably attaching the tool core to the surface of the male tool during the fiber placement process such that the tool core remains in place during the process. After the fiber placement is complete, the tool core is released from the surface of the tool and any openings in the tool required to attach the tool core are sealed. As in the case of the prior art, the entire assembly is placed in a vacuum bag for pressure curing in an autoclave. The tool core is a part of the sealed assembly except that the opening through the tool core thickness is opened on one surface and is to exposed to the elevated pressure of the autoclave. Since the tool core is enclosed in an inflatable bag, the bag will be inflated by the autoclave pressure and the tool core will conform exactly to the shape of the opening in the structural core. When the finished structure is returned to room temperature and pressure, the tool core will fall out of the structure when it is removed from the tool.

DETAILED DESCRIPTION OF THE PREFERRED EMBODIMENT

Figure 1:
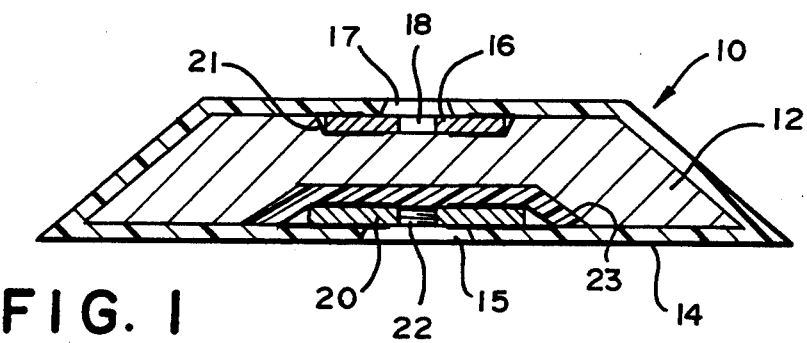
FIG. 1 is a cross sectional view of the tool core of the invention.

Referring now to FIG. 1, there is shown generally at 10 a tool core according to the invention. The tool core assembly consists of an inner member 12 of rigid or semi-rigid material. It is desirable to have the inner member of the tool core of the same material as the mandrel for forming the composite structure or , at least, of a material having a similar thermal coefficient of expansion. For example, if the tool is made of aluminum, the inner member of the tool core could be made of perforated and stabilized aluminum honeycomb. This material is light weight and, more importantly, has a coefficient of thermal expansion similar to that of the tool so that under the heat of the curing process, they will expand at nearly equal rates to maintain the dimensional integrity of the structural composite part. The inner member of the core is surrounded by an elastic bag 14 having an opening 17 in its upper surface. In the upper surface of the tool core there is provided a rigid washer 16 having an opening 18 therein. This washer is sealed to the bag 14 by an adhesive layer 21. In the bottom surface there is provided a second rigid washer 20, encapsulated in the bag 14 by the sealing member 23. This washer has a threaded hole 22, the function of which will be described in the description of the operation of the device.

Figure 2B:
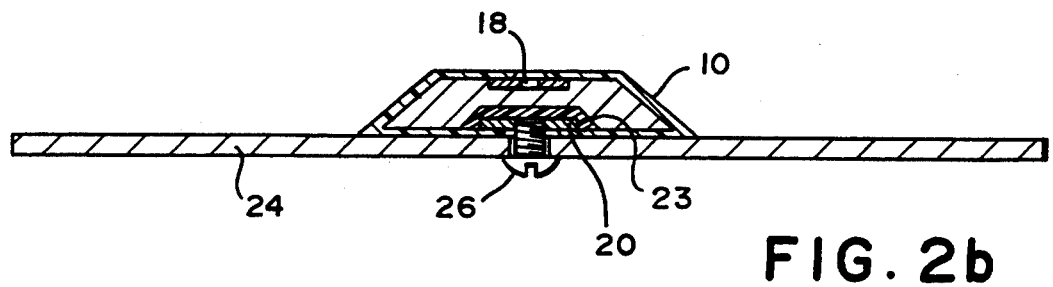
FIG. 2b is sectional view of the tool of FIG. 2a taken along line A—A with a tool core installed.
Figure 2A:
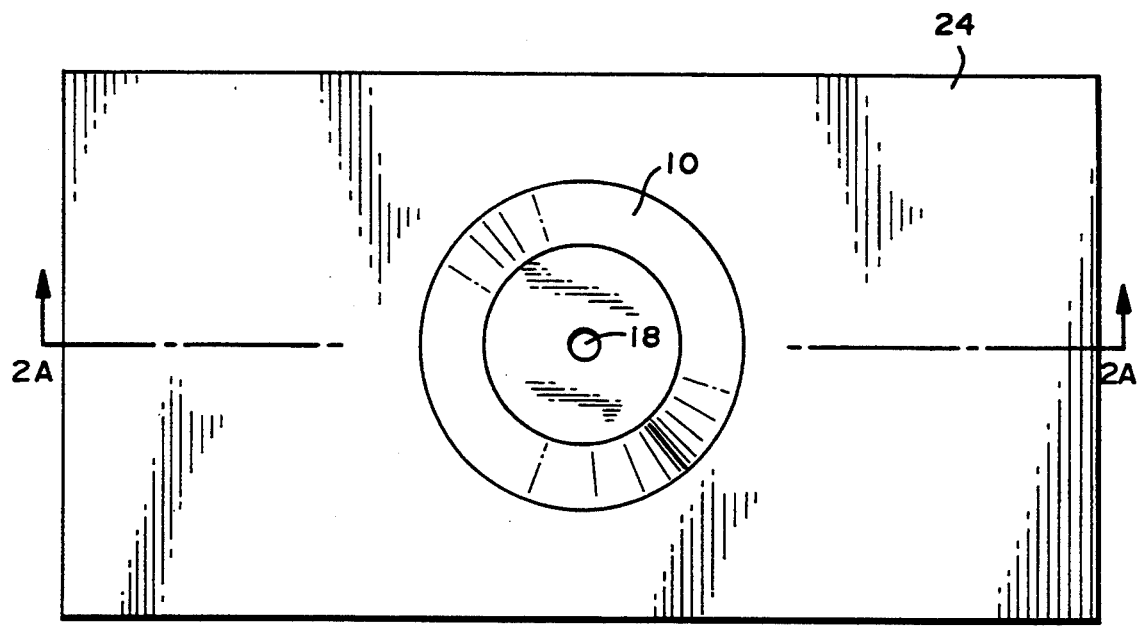
FIG. 2a is a plan view of a mandrel with a tool core attached.

Referring now to FIGS. 2a and 2b, there is shown a tool core according to the invention attached to a simple tool surface. In FIG. 2a the mandrel 24 is a flat plate of aluminum or other appropriate metal. Attached to the mandrel 24 is a tool core 10. The tool core is attached to the mandrel by any releasable fastening means. In FIG. 2b, the tool core is fastened to the tool by a screw 26 which is inserted through the tool 24 and threaded into the threaded hole 22 in the lower washer 20. As shown in FIGS. 2a and 2b, the tool assembly consisting of the tool 24 and the tool core 10 is ready for application of fibers to the tool.

Figure 3:
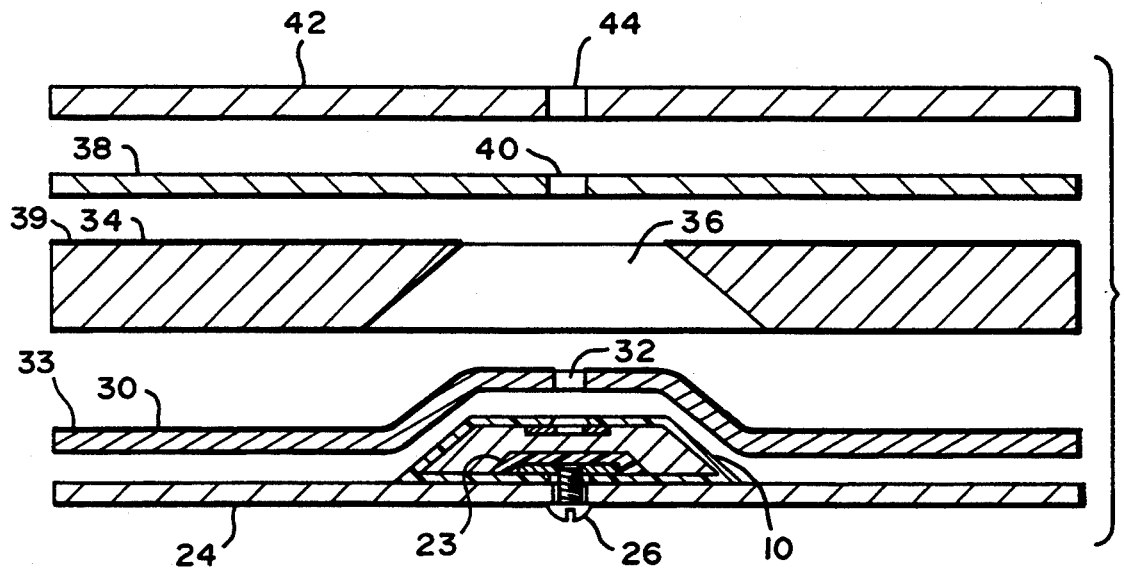
FIG. 3 is an exploded view of composite structure formed on the tool.

Referring now to FIG. 3, there is shown an exploded view of the composite structure to be formed as well as the tool-tool core assembly and the vacuum bag used in the curing process. The fiber placement is begun with the mandrel as shown in FIGS. 2a and 2b. The first layer of fibers 30 is laid on the tool according to the pre-set pattern. This layer will form the inner skin of the finished structure. These fibers 30 are laid continuously, covering the appropriate part of the mandrel and the tool core. A layer of adhesive 31 is placed on the exposed surface of this inner skin to attach the structure core 34 to the skin. In this illustration, the structure core 34 is a circular member having an opening 36, shown as a tapered opening. The opening may be of any required shape. The structure core 34 can be of any known honeycomb material such as Aramid or other light weight strong material known in the art. The structure core 34 is placed against the adhesive layer on the inner skin with the opening 36 aligned over the tool core 10. The structure core 34 is placed against the inner skin adhesive layer 33 and pressed in place. Another layer of adhesive 39 is applied to the exposed surface of the structure core 34 to receive the fibers to form the outer skin 38. When the structure core 34 and adhesive layer 37 are in place, the fibers forming the skin 38 are applied to the exposed surface of the structure. When the fiber placement for the outer skin 38 is complete, a vacuum bag 42 is applied over the entire structure and sealed at its edges to the edges of the tool. An opening 44 is cut in the bag 42 and opening 40 is cut in the outer skin 38 in alignment with the hole in the bag. This opening 44 is aligned with the opening 36 in the structure core 34. This opening is continued through a hole 32 in alignment with the opening 18 in the tool core.

Figure 4:
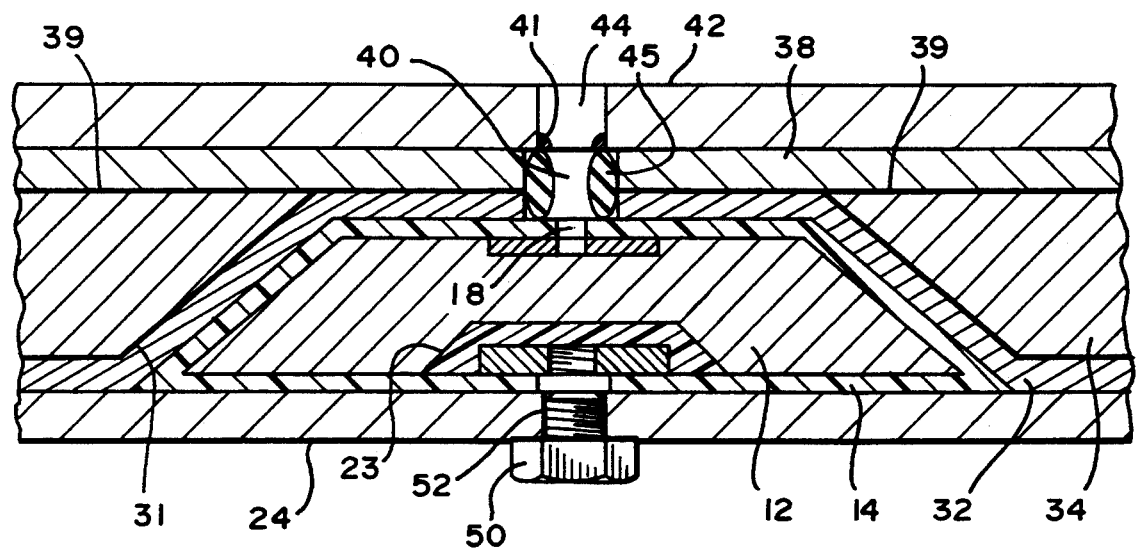
FIG. 4 is an enlarged partial sectional view of the tool core in the composite structure prepared for curing.

Referring now to FIG. 4, there is shown an enlarged sectional view taken through the layup of FIG. 3 after the entire assembly of tool, tool core, fiber skins, adhesives and structure core has been finally prepared for curing at elevated pressure and temperature. The bag 42 is sealed to the outer skin 38 sealant 41 and to the tool core bag 14 by means of sealing tape 45. The screw 26 which was used to hold the tool core in place during the fiber and structure core placement has been removed. Another screw 50 has been fastened into the opening in the tool used for the screw 26. This screw 50 has been sealed in the hole in the tool to form an air tight closure in the tool. As can be seen, the core tool 10 is now held in the assembly only by the fiber skins 32 and 38 and the bag 42. When the assembly is placed in an autoclave chamber or similar pressure vessel, the interior of the tool core bag 14 is exposed to the elevated pressure of the curing chamber. Thus, the tool core bag 14 expands to eliminate any voids between the skins 32 and 38 and the structure core 34 insuring the integrity of the composite structure in the area of the opening 36. When the curing cycle is complete, and the tool and the composite structure have cooled, the tool core 10 will drop from the assembly when it is removed from the tool.

Thus it can be seen that there is provided herein a tool core for forming an opening in a composite structure which is usable in structures formed by fiber placement on a male tool or tool. Because the tool core expands in response to the curing pressure, the opening in the composite structure is formed without voids or weaknesses in the structure around the opening.

What is claimed is:

1. A tool for forming an opening in a composite structure to be cured at elevated temperature and pressure, said composite structure comprising a central structural core having an opening therethrough, said structural core being covered by an inner skin and an outer skin, said tool comprising:

a tool upon which the composite structure is formed;

a tool core inner member having an upper and a lower surface and having the approximate shape of the opening to be formed in the composite structure, said tool core inner member having an opening therein;

an inflatable elastic bag surrounding said tool core inner member, said elastic bag having an opening therethrough in register with the opening in the tool core inner member, said openings positioned so as to be adjacent the inner skin of the composite structure, said tool core inner member and the inflatable elastic bag surrounding said tool core inner member forming a tool core; and removable attaching means for attaching said tool core to said tool in approximate registry with the opening in the structural core whereby, when the removable attaching means are removed, the tool core is free to move into the opening in the composite structure during the curing process and the pressure of the curing process inflates the elastic bag surrounding the tool core inner member to conform the tool core to the shape of the opening in the composite structure and retain the tool core in place.

2. The tool according to claim 1 wherein the means for releasably attaching said tool core to said tool comprises:

an attaching element fastened at the lower surface of the tool core nearest the mandrel, said attaching element having a threaded hole therethrough in registry with the opening in said tool core; and screw means inserted through a through hole in said mandrel, said through hole being at the location on the mandrel where the tool core is to be attached, said screw means being threaded into the threaded opening in the attachment member of said tool core for attaching said tool core to the mandrel, said tool core being releasable from said mandrel by removing said screw means from engagement with the attachment member of said tool core.

3. The tool according to claim 2 and further comprising means for sealing the through hole in said tool when said tool core is released from attachment to said tool.

4. The tool core according to claim 3 wherein the means for sealing the through hole in said mandrel comprises:

screw threads applied in the through hole in said tool;

a screw plug threaded into the threads of the through hole in said tool from the bottom of said tool, said screw plug terminating at the upper surface of said tool; and sealant material applied to the screw threads of said screw plug and said through hole to seal the through hole in the tool when the composite structure is exposed to elevated pressure and temperature during curing.

* * * * *